(12) United States Patent  (10) Patent No.: US 8,527,547 B2
Parida et al.  (45) Date of Patent: Sep. 3, 2013

(54) SAMPLING THE SPACE OF ANCESTRAL RECOMBINATION GRAPHS

(75) Inventors: Laxmi P. Parida, Mohegan Lake, NY (US); Asif Javed, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 13/169,824

(22) Filed: Jun. 27, 2011

(65) Prior Publication Data

US 2012/0331008 A1  Dec. 27, 2012

(51) Int. Cl.
*G06F 7/00* (2006.01)
*G06F 17/30* (2006.01)

(52) U.S. Cl.
CPC .... *G06F 17/30958* (2013.01); *G06F 17/30327* (2013.01); *G06F 17/30625* (2013.01); *G06F 17/30961* (2013.01); *Y10S 707/956* (2013.01)
USPC ............ 707/798; 707/778; 707/797; 707/956

(58) Field of Classification Search
CPC .................... G06F 17/30958; G06F 17/30327; G06F 17/30625; G06F 17/30961
USPC ................................. 707/778, 797, 798, 956
See application file for complete search history.

(56) References Cited

U.S. PATENT DOCUMENTS

| | | | |
|---|---|---|---|
| 5,832,482 A | 11/1998 | Yu et al. | |
| 6,324,533 B1 | 11/2001 | Agrawal et al. | |
| 6,816,867 B2 | 11/2004 | Jevons et al. | |
| 7,031,948 B2 * | 4/2006 | Lee | 706/14 |
| 7,293,000 B2 * | 11/2007 | Lee | 706/12 |
| 8,351,847 B2 * | 1/2013 | Lee | 455/10 |
| 2003/0163437 A1 * | 8/2003 | Lee | 706/47 |
| 2004/0210900 A1 * | 10/2004 | Jones et al. | 718/100 |
| 2004/0210901 A1 * | 10/2004 | Jones et al. | 718/102 |
| 2004/0216121 A1 * | 10/2004 | Jones et al. | 718/107 |
| 2005/0005273 A1 * | 1/2005 | Jones et al. | 718/108 |
| 2005/0116949 A1 * | 6/2005 | Hoppe | 345/423 |
| 2009/0132584 A1 * | 5/2009 | Parida | 707/104.1 |

OTHER PUBLICATIONS

Hein, J., "A Gibbs Sampler of the Ancestral Recombination Graph," Cornell—Ancestral Recombination Graph, Jul. 15, 2008.

* cited by examiner

*Primary Examiner* — Phong Nguyen
(74) *Attorney, Agent, or Firm* — Thomas Grzesik; Fleit Gibbons Gutman Bongini & Bianco PL

(57) ABSTRACT

A method is provided for constructing an ancestral recombination graph. A value K is received representing K extant units. M non-mixing segments are also received. K vertices V are generated. K lineages for each of M trees are associated with each of the K vertices. An ancestral recombination graph is constructed. To construct the ancestral recombination graph, there is repeated, until only one lineage survives for each of the M trees, a process that includes the following. A tree is randomly selected. A first vertex $v_1$ and a second vertex $v_2$ are randomly selected. Two adjoining segments in the M non-mixing segments of the first and second vertices are combined together into a single vertex. A separate vertex is generated for at least one remaining segment in each of the M non-mixing segments of the first and second vertices. The vertices V are updated to be vertices that are non-interior vertices.

20 Claims, 10 Drawing Sheets

1. The ARG structure has K vertices (leaf nodes). Also $h \leftarrow 0$   900

2. The K lineages for each of the M trees is associated with each of the K leaf vertices as follows: For each of the vertex $v_i$, $i = 1, \ldots, K$, the lineages associated are $l_t$ where $t = 1, 2, \ldots, M$. This is written as $C(v_i) = \{l_1, l_2, l_3, \ldots, l_M\}$.

3. For each t, $L_t$ is initialized to K, i.e., for $t = 1, \ldots M$, $L_t \leftarrow K$.

4. Let V be the K (extant) vertices and $n_v \leftarrow K$.

5. REPEAT (a) $h \leftarrow h + 1$
   (b) Pick two vertices $v_1$ and $v_2$ out of the $n_v$ vertices as follows. Let $$T = \{1 \leq t \leq M \mid L_t > 1\}. \qquad (2)$$

Pick a tree r uniformly at random from the set T. Let $$V' = \{v \in V \mid l_r \in C(v)\}. \qquad (3)$$

(c) The waiting time H2, in generations, of $v_1$ and $v_2$ to have a common ancestor is computed as follows. Let $n_t = |T|$. Then $$H_2 = \min_{t=1,\ldots,n_t} H_t, \qquad (4)$$

where (see also Eqn 1): $P(H_t \leq x) = 1 - e^{-\binom{L_r}{2}x}$. Let the corresponding new node be $v_3$ (d) For $i = 1, 2$
      1. Compute a breakpoint uniformly at random using the lengths $(s_0, s_1, s_2, \ldots, s_M)$.
      2. This breakpoint breaks $C(v_i)$ into two $C_L(v_i)$ and $C_R(v_i)$ (one of which could be possibly empty) Without loss of generality let, $l_r \in C_L(v_i)$ hold.
   Update the associated lineages and $L_t$ as follows:
      1. $C(v_3) = C_L(v_1) \cup C_L(v_2)$
      2. For $i = 1, 2$, $C(v_i) \leftarrow C(v_i) \setminus C_L(v_i)$
      3. For $l_j \in C_L(v_1) \cap C_L(v_2)$, $L_j \leftarrow L_j - 1$ (e) Update V to be the vertices that are not interior vertices of the ARG. Also, update $v_n \leftarrow |V|$.

UNTIL $\sum_{t=1}^{M} L_t = M$.

6. Termination: Compute the waiting time $H_{n_V}$, in generations, of the $n_V$ vertices to have a common ancestor (two at a time) [HSW05]:

$$P(H_{n_V} \leq t) = \sum_{k=1}^{n_V} (-1)^{k-1} (2k - 1) e^{-k(k-1)t/2} \frac{(n_V - 1) \ldots (n_V - (k - 1))}{(n_V + 1) \ldots (n_V + (k - 1))}.$$

The new node corresponding to this is the root of the structure under construction.

SAMPLING THE SPACE OF ANCESTRAL RECOMBINATION GRAPHS

FIELD OF THE INVENTION

The present invention generally relates to computational biology, and more particularly relates to ancestral recombination graphs.

BACKGROUND OF THE INVENTION

The genetic evolution of populations is an important problem and has been studied extensively over the past few decades. This problem is regaining momentum as more and more detailed genomes of different organisms, which highlight the unexpected diversity within a species, become available. There are two broad directions for studying and understanding this diversity. One direction is through population simulation studies that help hypothesize various evolutionary constraints and conditions, and help understand the observed population structures in that context. The other direction is to reconstruct a plausible evolutionary history given the observed population structure as extant units. In the context of humans, the reconstruction of trees from human genome data under uni-linear transmission, such as non-recombining Y chromosome (NRY) or mitochondrial data, are well accepted. However, evolutionary reconstruction of recombining portions of the genome is a challenge.

SUMMARY OF THE INVENTION

One embodiment of the present invention provides a method for constructing an ancestral recombination graph. According to the method, a value K is received, with K being the number of extant units representing K individuals of a current generation being studied. M non-mixing segments in the K extant units are also received. K vertices V are generated. Each of the K extant units is initially assigned to the K vertices V, where K lineages for each of M trees are associated with each of the K vertices. An ancestral recombination graph is constructed based on at least the K extant units and the M non-mixing segments. To construct the ancestral recombination graph, there is repeated, until only one lineage survives for each of the M trees, a process that includes the following. A tree is randomly selected tree from the M trees. A first vertex $v_1$ and a second vertex $v_2$ are randomly selected from the vertices V. Two adjoining segments in the M non-mixing segments of the first vertex $v_1$ and the second vertex $v_2$ are combined together into a single vertex. A separate vertex is generated for at least one remaining segment in each of the M non-mixing segments of the first vertex $v_1$ and the second vertex $v_2$. The vertices V are updated to be vertices that are non-interior vertices.

In another embodiment, an information processing system for constructing an ancestral recombination graph is disclosed. The information processing system comprises memory and a processor communicatively that is coupled to the memory. An ancestral recombination graph constructor is communicatively coupled to the memory and the processor. The ancestral recombination graph constructor is configured to perform a method. According to the method, a value K is received, where K is the number of extant units representing K individuals of a current generation being studied. M non-mixing segments in the K extant units are also received. K vertices V are generated. Each of the K extant units is initially assigned to the K vertices V, where K lineages for each of M trees are associated with each of the K vertices. An ancestral recombination graph is constructed based on at least the K extant units and the M non-mixing segments that have been received until only one lineage survives for each of the M trees. To construct the ancestral recombination graph, there is repeated, until only one lineage survives for each of the M trees, a process that includes the following. A tree is randomly selected tree from the M trees. A first vertex $v_1$ and a second vertex $v_2$ are randomly selected from the vertices V. Two adjoining segments in the M non-mixing segments of the first vertex $v_1$ and the second vertex $v_2$ are combined together into a single vertex. A separate vertex is generated for at least one remaining segment in each of the M non-mixing segments of the first vertex $v_1$ and the second vertex $v_2$. The vertices V are updated to be vertices that are non-interior vertices.

In yet another embodiment, a non-transitory computer-readable medium encoded with a program for constructing an ancestral recombination graph is disclosed. The program comprising instructions for performing the following. A value K is received, where K is the number of extant units representing K individuals of a current generation being studied. M non-mixing segments in the K extant units are also received. K vertices V are generated. Each of the K extant units is initially assigned to the K vertices V, where K lineages for each of M trees are associated with each of the K vertices. An ancestral recombination graph is constructed based on at least the K extant units and the M non-mixing segments that have been received until only one lineage survives for each of the M trees. To construct the ancestral recombination graph, there is repeated, until only one lineage survives for each of the M trees, a process that includes the following. A tree is randomly selected tree from the M trees. A first vertex $v_1$ and a second vertex $v_2$ are randomly selected from the vertices V. Two adjoining segments in the M non-mixing segments of the first vertex $v_1$ and the second vertex $v_2$ are combined together into a single vertex. A separate vertex is generated for at least one remaining segment in each of the M non-mixing segments of the first vertex $v_1$ and the second vertex $v_2$. The vertices V are updated to be vertices that are non-interior vertices.

Other objects, features, and advantages of the present invention will become apparent from the following detailed description. It should be understood, however, that the detailed description and specific examples, while indicating various embodiments of the present invention, are given by way of illustration only and various modifications may naturally be performed without deviating from the present invention.

BRIEF DESCRIPTION OF THE DRAWINGS

FIG. 9 shows an algorithm for constructing an ARG in accordance with one embodiment of the present invention;

DETAILED DESCRIPTION

Figure 2:
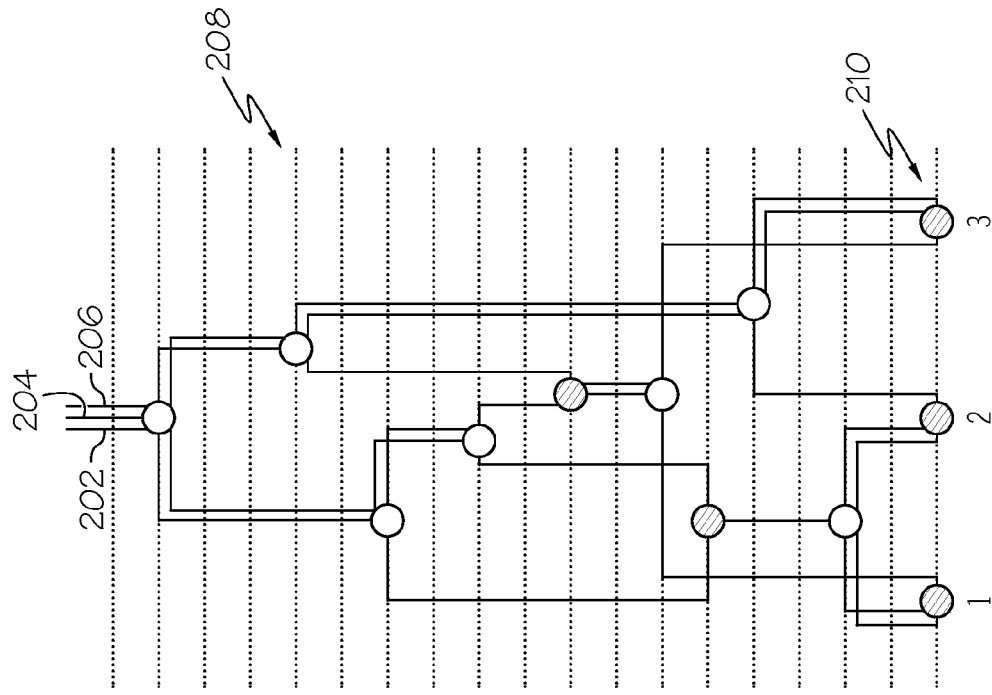
FIG. 2 shows three trees embedded within the ARG topology of FIG. 1.

Various embodiments of the present invention will be discussed in detail hereinbelow with reference to the attached drawings.

Embodiments of the present invention are directed to ancestral recombination graphs. An ancestral recombination graph (ARG) is a phylogenetic structure that encodes both duplication events, such as mutations, as well as genetic exchange events, such as recombinations. This structure captures the (genetic) dynamics of a population evolving over generations. One embodiment of the present invention addresses the problem of identifying a class of maximally resolvable substructures of the ARG. The term "resolvable" indicates that enough evidence of the genetic events, via the structure, is transmitted all the way to the extant units such that it can be recovered from the joint evidences in all the extant units. This class of resolvable structures is referred to as the coalescent ARG.

Further embodiments characterize the topology of the coalescent ARG. Based on this characterization, a sampling algorithm is utilized to uniformly sample the space of coalescent ARGs. Because only a compact structure with resolvable nodes is constructed, the algorithm is very efficient both in time and in space. In fact the algorithm can also be adapted to sample the space of generic ARGs as well.

A simulation algorithm is utilized to construct the coalescent ARG. Not only is the coalescent ARG much less redundant (structurally) from a general population simulation standpoint, it is also more precise for evaluating the performance of methods from a reconstructability perspective. The compactness of the coalescent ARG structure leads to both time as well as space efficiencies in the implementation of the sampling algorithm.

One embodiment identifies maximal resolvable structures that do not compromise the details of the genetic dynamics for simulation studies and at the same time are more meaningful for reconstruction studies. Another embodiment also characterizes the irresolvable nodes in an ARG. Three classes of ARGs are identified: (1) generic ARGs; (2) coalescent ARGs, which are herein defined as the maximal resolvable substructure of the generic ARG; and (3) reconstructible ARGs, which are not any more resolved than coalescent ARGs.

The algorithms of the present invention can be utilized to provide a simulation that generates a pair of information: (1) a descriptor network, and (2) extant samples. This produces the smallest descriptor possible. It is exponentially smaller than the descriptor network of other standard methods. As the number of samples and/or the length of each sample increases, so does the descriptor. However the descriptor size is of the same order as that of the output samples.

The following is a more detailed discussion with respect to resolvable structures. An ARG, in one embodiment of the present invention, is parameterized by three values: K, which is the number of extant units; 2N, which is the population size; and $\rho$, which is the population recombination rate.

Figure 1:
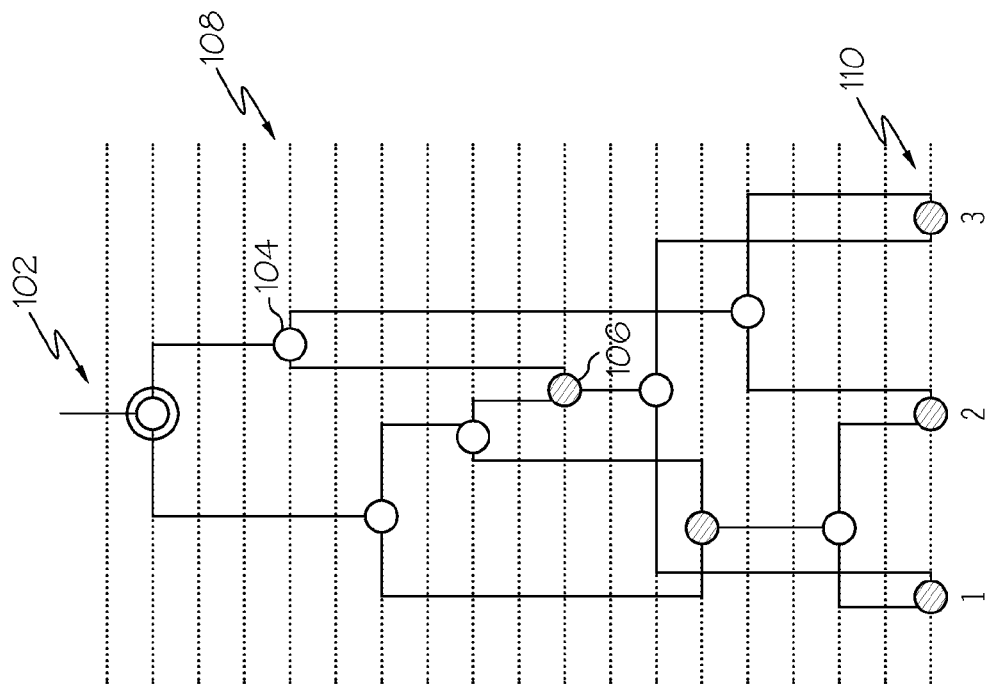
FIG. 1 illustrates an exemplary ancestral recombination graph (ARG) topology in accordance with one embodiment of the present invention.

One observation is that for every ARG G on K extant units, there exists some M such that G is the union of M overlapping trees (or forests), each with the K extant units. This is illustrated in FIGS. 1 and 2. FIG. 1 shows a topology 102 of an ARG in which hollow nodes 104 are the coalescent nodes (single parent) and hatched nodes 106 are the recombination nodes (with multiple parents). FIG. 2 shows a possible embedding of three trees 202, 204, and 206. Dotted horizontal lines 108 and 208 represent time (in generations), and the extant units, which are numbered 1, 2, and 3, are at the bottom row 110 and 210. Thus, K=3 in the example of FIGS. 1 and 2. The genetic material flows from the nodes at a higher level to the nodes at the lower level.

Based on the above observation, an ARG is defined as a random graph with three parameters K, N, and M, where K is the number of extant units, N is the size of the population at each generation, and M is the number of non-mixing or completely-linked segments in the extant units. A non-mixing unit is also referred to as an identity-by-descent (IBD) segment. These two different sets of parameters tessellate the space of ARGs in two different ways, as shown in FIG. 3.

Figure 3:
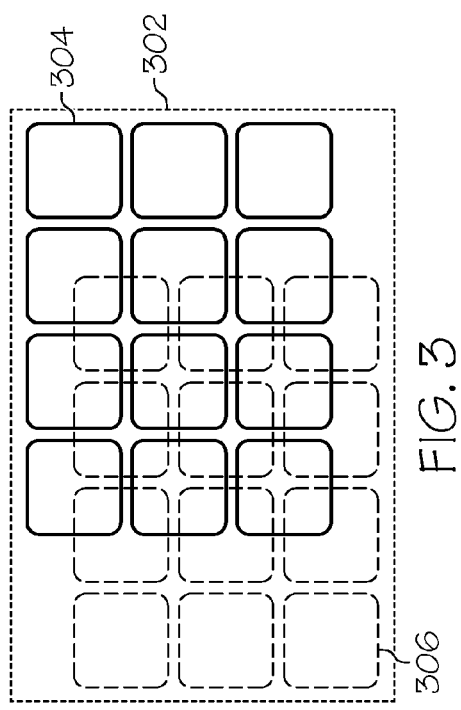
FIG. 3 illustrates the space of all possible ARGs with parameters K and N.

The outer rectangle 302 in FIG. 3 represents the (infinite) space of all possible ARGs with parameters K,N:K is the number of extant units and 2N is the population size at each generation. The use of the third parameter either as (a) M, the number of non-mixing segments, or (b) population recombination rate $\rho$ can be viewed as tiling the space of ARGs in two different ways as shown. The squares 304 with the solid lines correspond to (a) and the squares 306 with the dashed lines correspond to (b). Each square tile corresponds to a fixed value of M or $\rho$, as the case may be.

With respect to the notion of resolvable structures, the term "resolvable" refers to the reconstruction of the evolution structure from the genetic information of only the extant units. By studying the characteristics of each node of a coalescent tree, embodiments of the present invention are able to determine resolvable portions, if any, of a population that is evolving over generations with imprints of genetic evolution on the genome of each unit.

Figure 4:
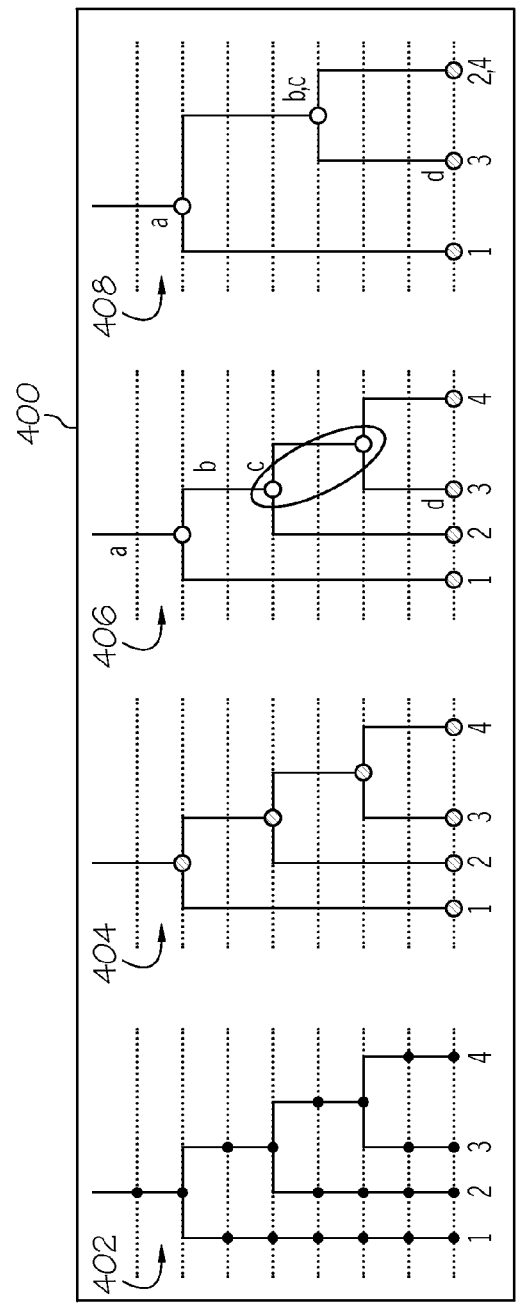
FIG. 4 shows a duplications model on four extant units in accordance with one embodiment of the present invention.

For example, FIG. 4 shows a duplications model 400 on four extant units. The exact detail of mutations along the gene flow is shown in topology 402. After removing the nodes that form chains, the generic tree is shown in topology 404. Notice that the mutations b and c in the third tree 406 are bunched together and the time order between the two cannot be resolved. Similarly, the time of mutations a and d in topology 406 also cannot be resolved exactly. More importantly, an internal node (that was not marked by any mutation) is lost altogether, since there is no evidence of it in the extant units. Thus, the reconstructed topology 408, which is the best that can be obtained without any further external information, is a less resolved version of the true topology. This structure is also the result of the coalescent processes on the genomes of the extant units and is referred to as a coalescent tree.

Figure 5:
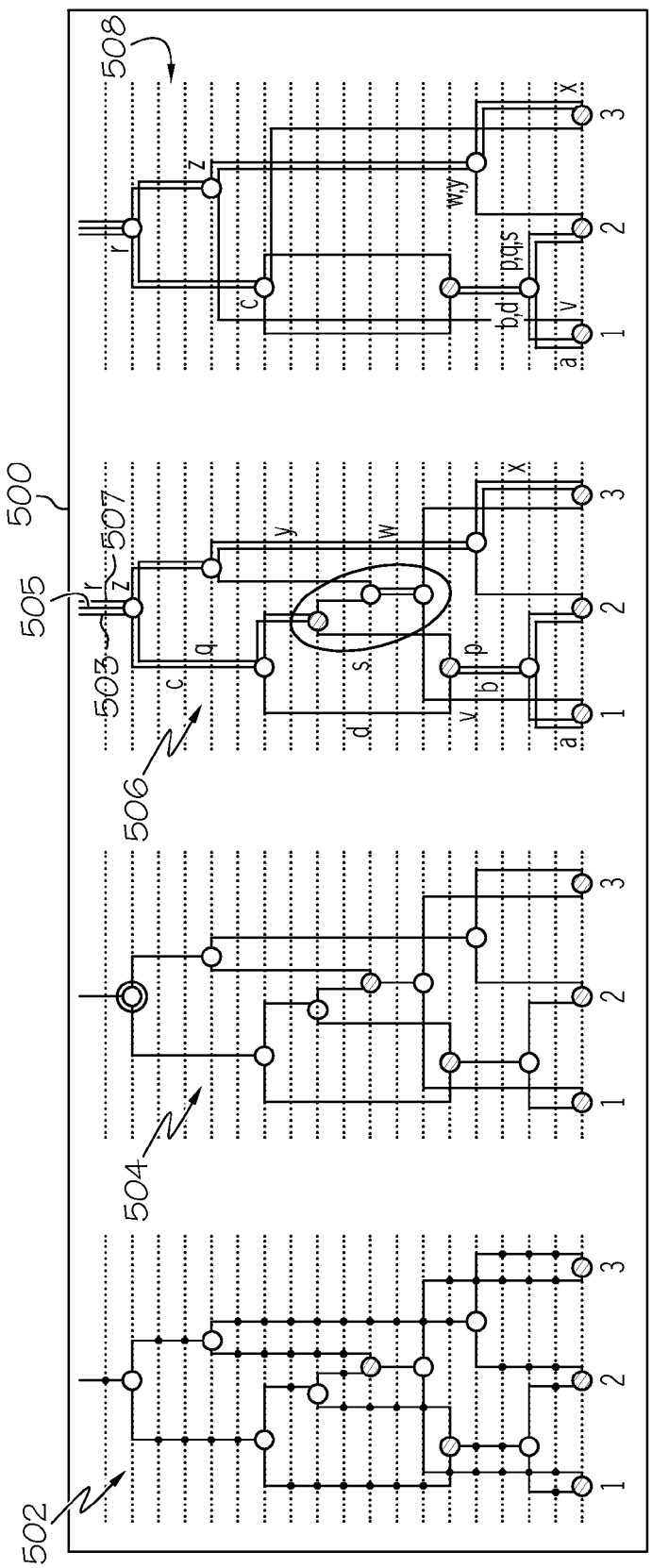
FIG. 5 shows a genetic exchange model in accordance with one embodiment of the present invention.

FIG. 5 shows a genetic exchange model 500 for the four extant units. Under the genetic exchange model 500 the structure is more complex due to the recombination events, but overall the structure is still the same. The exact detail of mutations and recombinations is shown in topology 502. After removing the nodes that form chains, the corresponding generic ARG is shown in topology 504. In accordance with the above observation, the ARG 506 is a union of three overlapping trees 503, 505, and 507. Again there is a bunching of mutation events: b and d in the first tree 503, p, q, and s in the second tree 505, and w and y in the third tree 507. Thus, the timing between them cannot be resolved.

More importantly, the distinctions between the encircled nodes in topology 506 are lost altogether, because there is no evidence of it in the extant units. Thus, a reconstructed topology 508, which is the best that can be obtained without any further external information, is a less resolved version of the true topology. Analogous to the duplications model 400, the reconstructed topology 508 is referred to as a coalescent ARG.

Figure 6:
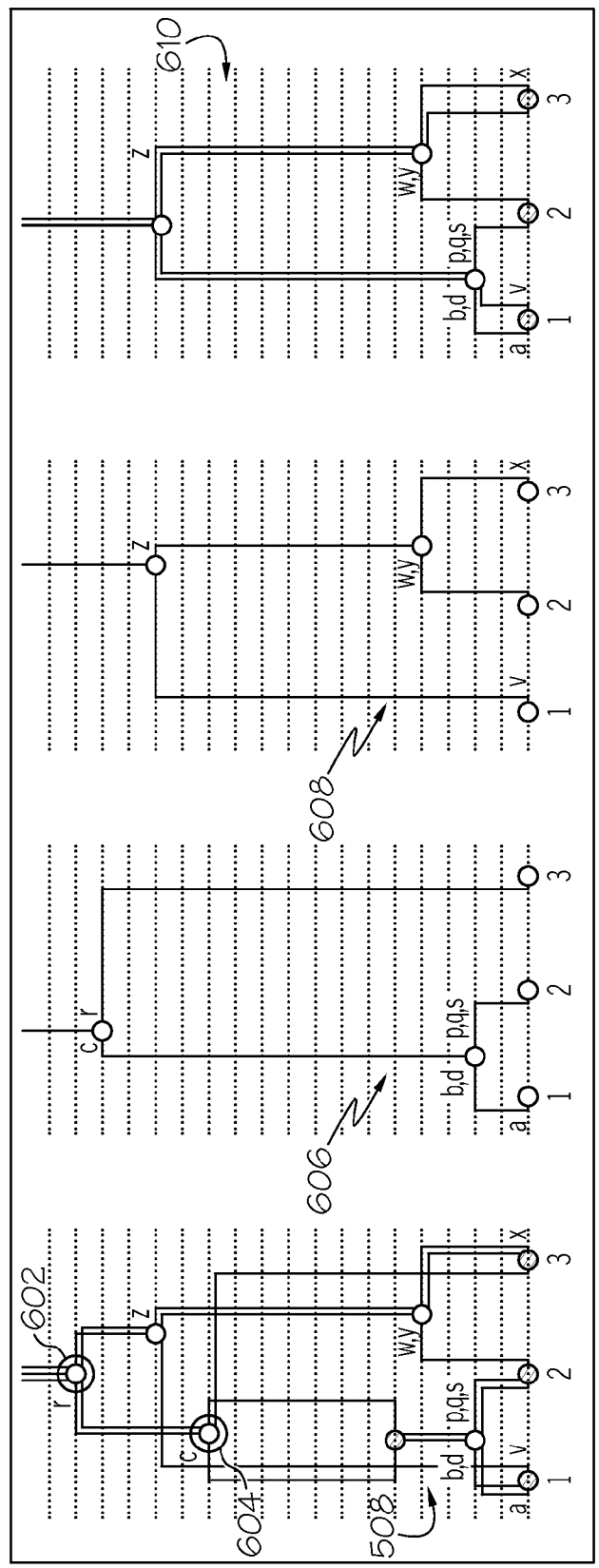
FIG. 6 shows an example in which a reconstructible ARG is less resolved than a coalescent ARG.

Another observation regarding the characteristic of each node in the coalescent ARG is that a non-leaf resolvable node must be the coalescent node in at least one on the M trees. Therefore, a coalescent ARG is not reconstructible. For example, consider the coalescent ARG 508 shown in FIG. 5. FIG. 6 shows nodes 602 and 604 of the coalescent ARG 508 which cannot be resolved even though they meet the characteristic requirements of this second observation. The first two trees have identical topologies. Thus, the conditions in this second observation are necessary but not sufficient. FIG. 6 also shows a reconstructible ARG 610 based on the two trees 606 and 608.

Figure 8:
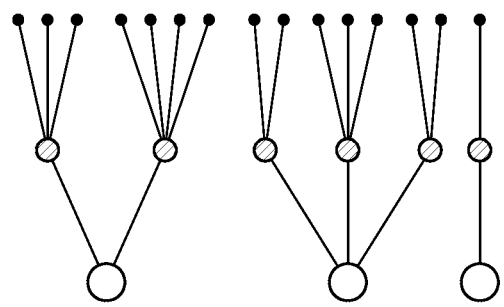
FIG. 8 shows the extent of resolution of each ARG class shown in FIG. 7 in accordance with one embodiment of the present invention.
Figure 7:
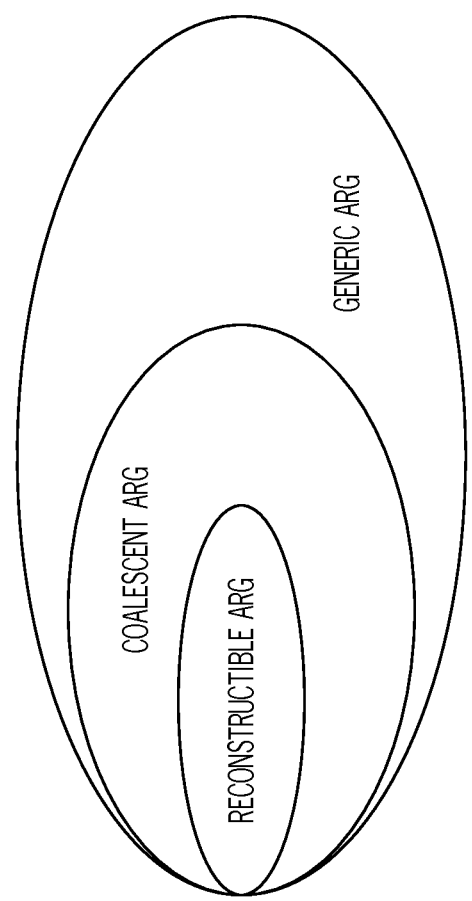
FIG. 7 shows the overall space of all the ARGs for a fixed set of parameters K, N, and M in accordance with one embodiment of the present invention.

The space of ARGs can be divided into generic, coalescent, and reconstructible as illustrated in FIGS. 7 and 8. At the same time, the coalescent ARG 610 of FIG. 6 is fully reconstructible up to the bunching of the mutations. As there exists a fully reconstructible coalescent ARG and using the second observation, the coalescent ARG is maximally reconstructible. In particular, FIGS. 7 and 8 show the overall space of all the ARGs for a fixed set of parameters K,N,M. The containment of the sets is not exact: multiple (possibly infinite) generic ARGs map onto a single coalescent ARG and similarly multiple coalescent ARGs map onto a single reconstructible ARG. This is illustrated in FIG. 8 in which the black circles represent a generic ARG. The circles with a diagonal pattern represent the coalescent ARG and the hollow circles represent the reconstructible ARG. This is to interpreted as indicating that it is possible for multiple generic ARGs to be represented by a single coalescent ARG (i.e., the details cannot be resolved). Similarly, it is possible that multiple coalescent ARGs are represented by a single reconstructible ARG (i.e., again the details cannot be resolved). The space of trees follows a similar structure.

In view of the above, a detailed discussion is now given with respect to constructing an ARG. One embodiment constructs an ARG by performing the following tasks, which can be carried out independently: (1) constructing the topology of the structure including the lengths (or time estimates) of the edges; and (2) annotating the edges of the structure with genetic events, where the number of events is a function of the length of the edges. In this embodiment, mutations are used as the genetic events. However, other genetic events are used in further embodiments.

In this embodiment, the ARG construction (or simulation) process takes the following input parameters: (1) $N(\geq 1)$, population size is $2N$ at each generation; (2) $K(>1)$, the number of extant units; and (3) $M(\geq 1)$ and $(s_0, s_1, s_2, \ldots, s_M)$, where M is the number of non-mixing units M. Also, the lengths of the units are $s_1, s_2, \ldots, s_M$. For convenience these are scaled such that $s_0+s_1+s_2+\ldots+s_M=1$. The length $s_o$ can be viewed as the remainder of the chromosome that is not being considered in each of the extant units. For simplicity, it is possible to assume that $s_0=s_1=s_2=\ldots=s_M$.

In simulations, the coalescent tree is usually binary. Therefore, from a simulation perspective, the characteristics of the coalescent model can be summarized as follows. In a coalescent tree, each internal node (which is not a leaf node) in the topology, is a coalescent node and has exactly two descendants. Some local properties of the coalescent ARG nodes can be deduced as follows from the above discussion. Each node in the coalescent ARG must be a coalescent node of one of the M trees, except the root node, and has at most two ascendants and at most two descendants.

With respect to estimating the length of the ARG edges, let $t_i$ denote epoch i. The distribution of the waiting time is computed until the most recent common ancestor (MRCA) of two lineages. Suppose there were no recombinations or M=1, then the number of lineages l at any generation satisfies the following: $1 \leq l \leq K$. However, under recombinations the number of lineages at any generation satisfies $1 \leq l \leq MK$. However, the coalescent time $T_2$ for two nodes to find an MRCA is distributed as $$P(T_2 = j) = \left(1 - \frac{1}{2N}\right)^{j-1} \frac{1}{2N},$$

for $j \geq 1$. The probability that two lineages out of the k lineages find a common ancestor $T_k=j$, $j \geq 1$ generations ago is $$P(T_k = j) \approx \left(1 - \binom{k}{2}\frac{1}{2N}\right)^{j-1} \binom{k}{2}\frac{1}{2N}.$$

$T_k$ is approximately a geometric distribution with parameter $$\binom{k}{2}\frac{1}{2N}.$$

FIG. 9 shows the pseudo code of an exemplary algorithm 900 for constructing an ARG. The parameter h in the pseudo code of FIG. 9 is the height of the ARG under construction. Hence h is initialized to 0 and increases as the algorithm iterates. Also, if a vertex v is such that all the lineages being transmitted through the vertex have an ancestor in the ARG structure under construction, then v is an interior vertex.

As indicated in FIG. 9, the ARG structure has K vertices (leaf nodes) and $h \leftarrow 0$. The K lineages for each of the M trees is associated with each of the K leaf vertices as follows: for each vertex $v_i$, $i=1, \ldots, K$, the lineages associated are $l_t$, where $t=1, 2, \ldots, M$. This is written as $C(v_1)=\{l_1, l_2, l_3, \ldots, l_M\}$. For each t, $L_t$ is initialized to K. For example, for $t=1, \ldots M$, $L_t \leftarrow K$. V is the K (extant) vertices and $n_v \leftarrow K$.

The following steps are repeated until $\Sigma_{t=1}^M = M$. In step (a), $h \leftarrow h+1$. In step (b), two vertices $v_1$ and $v_2$ are selected from the $n_v$ vertices as follows. Let $T=\{1 \leq t \leq M | L_t > 1\}$. A tree r is picked uniformly at random from the set T. Let $V'=\{v \in V | l_r \in C(v)\}$. A pair $v_1$ and $v_2$ ($v_1 \neq v_2$) is selected uniformly at random from V'.

In step (c), the waiting time $H_2$, in generations, of $v_1$ and $v_2$ to have a common ancestor is computed as follows: $n_t=|T|$, then $$H_2 = \min_{t=1,\ldots,n_t} H_t,,$$

where $$P(H_t \le x) = 1 - e^{-\binom{L_r}{2}x}.$$

The corresponding new node is $v_3$. In step (d), for i=1, 2, a breakpoint is computed uniformly at random using the lengths $(s_0, s_1, s_2, \ldots, s_M)$, and this breakpoint breaks $C(v_1)$ into two $C_L(v_1)$ and $C_R(v_1)$ (one of which could possibly be empty). Without loss of generality, $1_r \in C_L(v_1)$ holds. The associated lineages and $L_r$ are updated as follows: $C(v_3) = C_L(v_1) \cup (v_2)$; for i=1, 2, $C(v_1) \leftarrow C(v_1) \setminus C_L(v_1)$; and for $1_r \in C_L(v_1) \cap C_L(v_2)$, $L_j \leftarrow L_j - 1$.

In step (e), V is updated to be the vertices that are not interior vertices of the ARG. Also, $v_n \leftarrow |V|$ is updated. Once the iterative process terminates, the waiting time $H_{n_v}$ is then computed, in generations, of the $n_v$ vertices to have a common ancestor (two at a time):

$$P(H_{n_v} \le t) = \sum_{k=1}^{n_v} (-1)^{k-1}(2k-1)e^{-k(k-1)t/2}\frac{(n_v - 1) \ldots (n_v - (k-1))}{(n_v + 1) \ldots (n_v + (k-1))}.$$

The new node corresponding to this is the root of the structure under construction.

The REPEAT-UNTIL loop of FIG. 9 terminates because each iteration involves a coalescence and this reduces the number of lineages by at least one. Further, when M=1, the structure is a binary tree. In fact, it is a coalescent tree of the K extant nodes and the structure generated by the algorithm is a union of M binary trees (i.e., a mixed subgraph). Also, each binary tree is a coalescent tree corresponding to a non-mixing segment.

The algorithm 900 shown in FIG. 9 can be modified to construct a generic ARG. The modified algorithm is very similar to the one for constructing the coalescent ARG except for the following two steps. First, step 5(b) of the algorithm 900 is modified to directly select any two vertices $v_1$ and $v_2$ randomly from the $n_r$ vertices. Also, in step 5(c), $n_r$ is assumed to be 1 for the equation.

Figure 10:
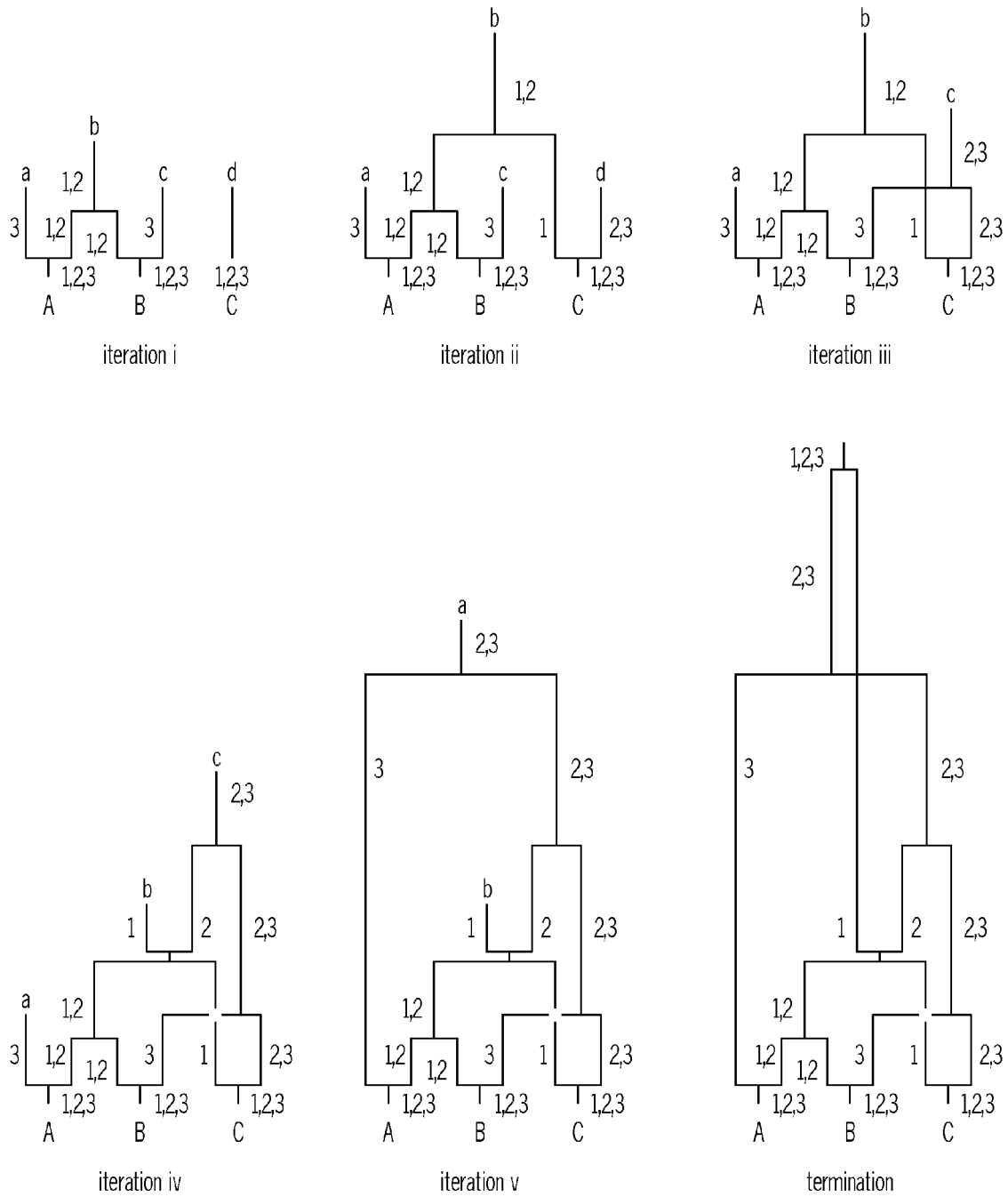
FIGS. 10 and 11 illustrate the construction of an ARG using the algorithm of FIG. 9.
Figure 11:
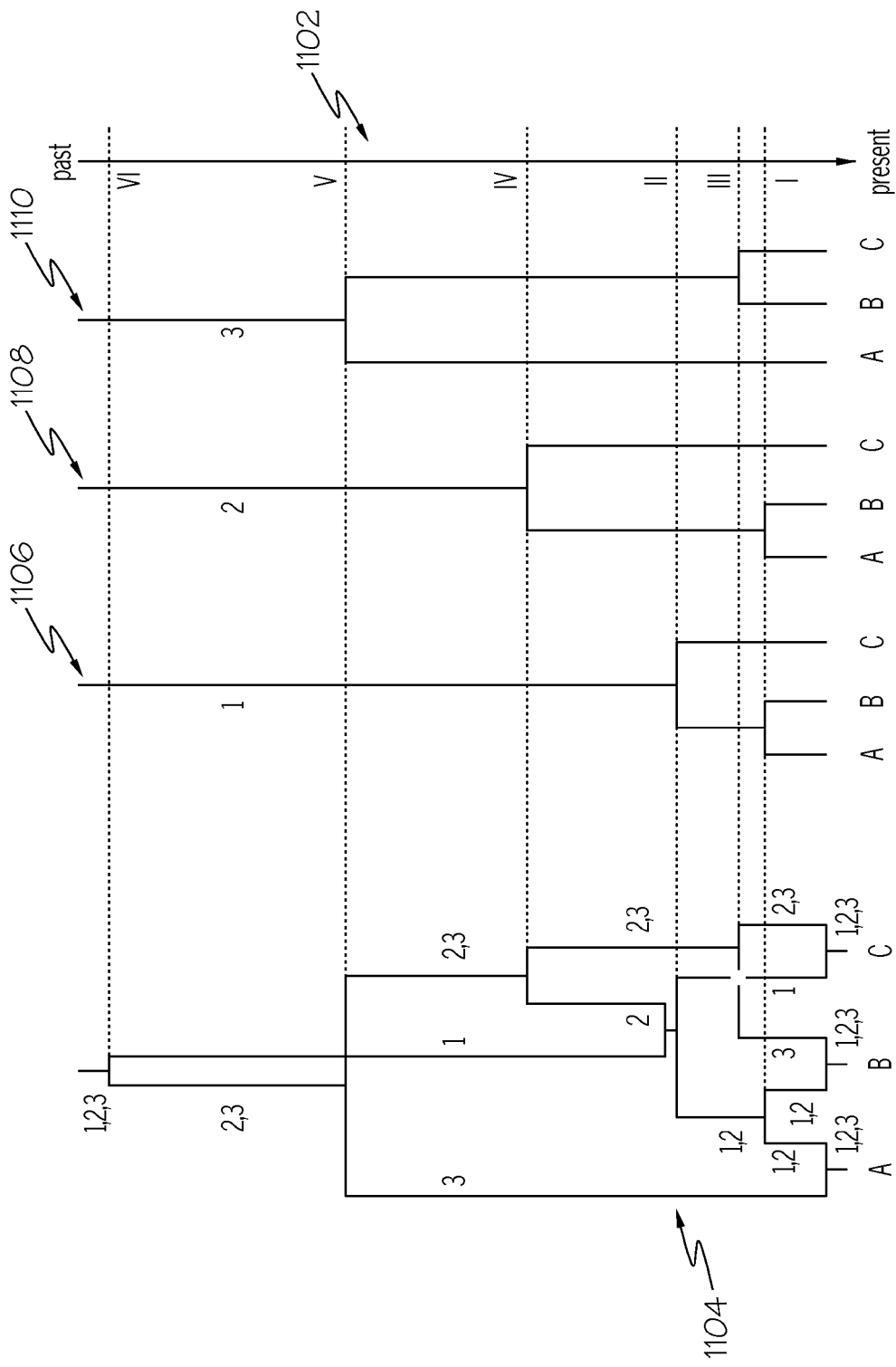

FIGS. 10 and 11 provide an illustrative example of constructing an ARG using the algorithm of FIG. 9. In the example of FIGS. 10 and 11, M=3 and K=3. The extant units are denoted as A, B, and C. In other words, there are three distinct individuals A, B, and C being studied, each with 3 segments (M=3), which are shown as 1, 2, and 3 in FIG. 10. Each of these three segments 1, 2, and 3 have a separate ancestral tree.

At the start of the algorithm, the number of lineages of each of the three trees is $L_1 = L_2 = L_3 = 3$ and the number of vertices are three, corresponding to A, B and C (each belongs to V of step 4 of the algorithm 900). The five iterations leading to three surviving lineages, one for each of the M trees, are indicated as iterations (i)-(v) in FIG. 10.

The first iteration is as follows. Because $L_1, L_2, L_3 > 1$, T={1, 2, 3} and (at step 5(b) of the algorithm 900) r=2 (i.e., tree 2 is selected at random from T). Next, V'={A,B,C} and vertices A and B are selected at random from V'. The depth of the coalescence is selected (step 5(c) of the algorithm 900), at generations indicated on the timeline 1102 in FIG. 11 as "I". Breakpoints are then randomly selected (step 5(d) of the algorithm 900). In the example shown in FIG. 10, the breakpoints on both the vertices (A and B) separate segment 3 from segments 1 and 2, with segments 1 and 2 being adjoining segments. The two adjoining segments 1 and 2 are combined together into a single vertex labeled "b". A separate vertex, labeled "a", is generated for segment 3 of A and a separate vertex, labeled "c", is generated for segment 3 of B. Another vertex, labeled "d", is generated for segments 1, 2, and 3 of C.

Now, $L_1 = L_2 = 2$, $L_3 = 3$ and there are four vertices in V, i.e., V={a,b,c,d} (step 5(e) of the algorithm 900). The two lineages of tree 1 are transmitted through vertices b, and d. The two lineages of tree 2 are transmitted through vertices b and d. The three lineages of tree 3 are transmitted through vertices a, c and d. This is repeated for another four iterations ii-v and after the fifth iteration v the process terminates (step 6 of the algorithm 900). The iterations shown in FIG. 10 are summarized below in Table 1.

TABLE 1

|               | $L_1$ | $L_2$ | $L_3$ | V            | r | $v_1, v_2$ |
|---------------|-------|-------|-------|--------------|---|------------|
| Iteration i   | 3     | 3     | 3     | {A, B, C}    | 2 | A, B       |
| Iteration ii  | 2     | 2     | 3     | {a, b, c, d} | 1 | b, d       |
| Iteration iii | 1     | 2     | 3     | {a, b, c, d} | 3 | c, d       |
| Iteration iv  | 1     | 2     | 2     | {a, b, c}    | 2 | b, c       |
| Iteration v   | 1     | 1     | 2     | {a, b, c}    | 3 | a, c       |
| Termination   | 1     | 1     | 1     | {a, b}       |   |            |

The termination step is as follows. Since $L_1 = L_2 = L_3 = 1$, the REPEAT-UNTIL loop of the algorithm 900 terminates. The depth of the coalescence of vertices a and b of iteration v is marked on the timeline 1102 as vi in FIG. 11. The algorithm 900 terminates because there remains only one non-interior vertex.

FIG. 11 shows the ARG 1104 for the above example. FIG. 11 also shows the three embedded trees (implicit): tree 1 1106, tree 2 1108, and tree 3 1110, of the ARG 1104. Once the ARG 1104 has been constructed, the edges of the structure can be annotated with genetic events, with the number of the events being a function of the length of the edges.

Figure 12:
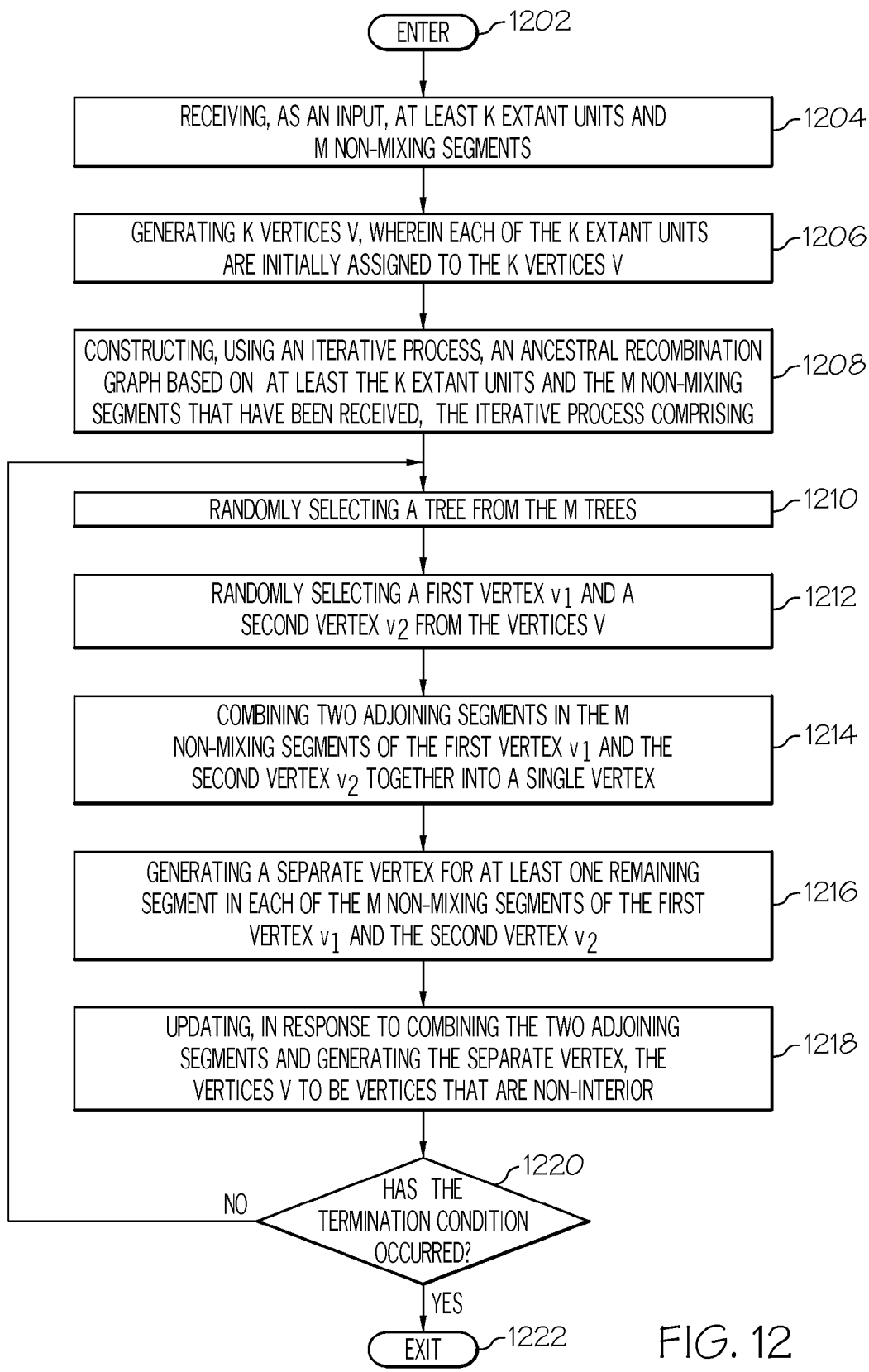
FIG. 12 is an operational flow diagram for constructing an ARG in accordance with one embodiment of the present invention.

FIG. 12 is an operational flow diagram for constructing an ARG according to one embodiment of the present invention. The operational flow diagram of FIG. 12 begins at step 1202 and flows directly to step 1204. An input is received, at step 1204, comprising the number K, where K represents K individuals of a current generation being studied, and M non-mixing segments in the K extant units. K vertices V are generated at step 1206. Each of the K extant units is initially assigned to the K vertices V, where K lineages for each of M trees are associated with each of the K vertices.

An ancestral recombination graph, at step 1208, is constructed using an iterative process, based on at least the K extant units and the M non-mixing segments that have been received. The iterative process is performed until only one lineage survives for each of the M trees. Each iteration in the iterative process comprises the following steps 1210-1218.

A tree, at step 1210, is randomly selected from the M trees. A first vertex $v_1$ and a second vertex $v_2$, at step 1212, are randomly selected from the vertices V. Two adjoining segments in the M non-mixing segments of the first vertex $v_1$ and the second vertex $v_2$, at step 1214, are combined together into a single vertex. A separate vertex for at least one remaining segment in each of the M non-mixing segments of the first vertex $v_1$ and the second vertex $v_2$ is generated at step 1216. The vertices V, at step 1218, are updated to be vertices that are non-interior vertices in response to combining the two adjoining segments and generating the separate vertex. A determination, at step 1220, is made as to whether a termination condition has occurred. If the result of this determination is negative, the control flow returns to step 1210. If the result of this determination is positive, the iterative process exits at step 1222.

Figure 13:
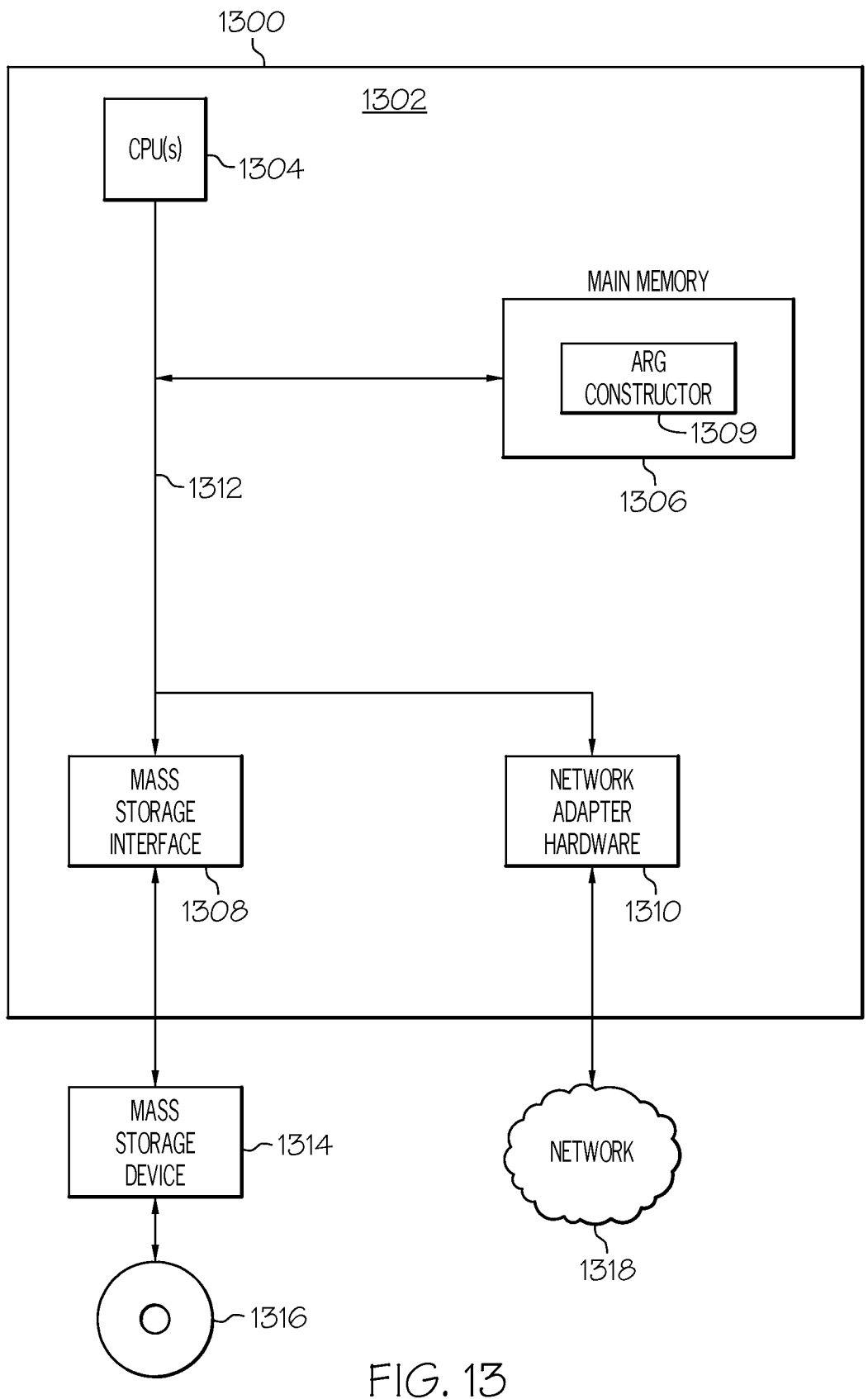
FIG. 13 is a block diagram illustrating an exemplary information processing system in accordance with one embodiment of the present invention.

FIG. 13 is a block diagram illustrating an exemplary information processing system that can be utilized in one or more embodiments of the present invention. The information processing system 1300 is based upon a suitably configured processing system adapted to implement an embodiment of the present invention. Similarly, any suitably configured processing system can be used as the information processing system 1300 in an embodiment of the present invention.

The information processing system 1300 includes a computer 1302. The computer 1302 has a processor(s) 1304 that is connected to a main memory 1306, mass storage interface 1308, and network adapter hardware 1310. A system bus 1312 interconnects these system components. The main memory 1306, in this embodiment, comprises an ARG constructor 1309 that is configured to construct a topology of an ARG structure including the lengths (or time estimates) of the edges and annotate the edges of the structure with genetic events, where the number of the events is a function of the length of the edges.

Although illustrated as concurrently resident in the main memory 1306, it is clear that respective components of the main memory 1306 are not required to be completely resident in the main memory 1306 at all times or even at the same time. In this embodiment, the information processing system 1300 utilizes conventional virtual addressing mechanisms to allow programs to behave as if they have access to a large, single storage entity, referred to herein as a computer system memory, instead of access to multiple, smaller storage entities such as the main memory 1306 and data storage device 1316. The term "computer system memory" is used herein to generically refer to the entire virtual memory of the information processing system 1300.

The mass storage interface 1308 is used to connect mass storage devices, such as mass storage device 1314, to the information processing system 1300. One specific type of data storage device is an optical drive such as a CD/DVD drive, which may be used to store data to and read data from a computer readable medium or storage product such as (but not limited to) a CD/DVD 1316. Another type of data storage device is a data storage device configured to support, for example, NTFS type file system operations.

Although only one CPU 1304 is illustrated for computer 1302, computer systems with multiple CPUs can be used equally effectively. Embodiments of the present invention further incorporate interfaces that each includes separate, fully programmed microprocessors that are used to off-load processing from the CPU 1304. An operating system included in the main memory is a suitable multitasking operating system such as any of the Linux, UNIX, Windows, and Windows Server based operating systems. Embodiments of the present invention are able to use any other suitable operating system. Some embodiments of the present invention utilize architectures, such as an object oriented framework mechanism, that allows instructions of the components of operating system to be executed on any processor located within the information processing system 1300. The network adapter hardware 1310 is used to provide an interface to a network 1318. Embodiments of the present invention are able to be adapted to work with any data communications connections including present day analog and/or digital techniques and any future networking mechanism.

Although the exemplary embodiments of the present invention are described in the context of a fully functional computer system, those of ordinary skill in the art will appreciate that various embodiments are capable of being distributed as a program product via CD or DVD, CD-ROM, or other form of recordable media, or via any type of electronic transmission mechanism.

Aspects of the present invention have been discussed above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments above were chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for constructing an ancestral recombination graph, the method comprising:

receiving a value K, where K is a positive integer number of extant units representing K individuals of a current generation being studied;

receiving M non-mixing segments in the K extant units, where M is a positive integer number;

generating K vertices V, each of the K extant units being initially assigned to the K vertices V, and K lineages for each of M trees being associated with each of the K vertices; and constructing an ancestral recombination graph based on at least the K extant units and the M non-mixing segments, wherein constructing the ancestral recombination graph comprises repeating, until only one lineage survives for each of the M trees, a process comprising:

randomly selecting one tree from the M trees;

randomly selecting a first vertex v1 and a second vertex v2 from the vertices V;

combining two adjoining segments in the M non-mixing segments of the first vertex v1 and the second vertex v2 together into a single vertex;

generating a separate vertex for at least one remaining segment in each of the M non-mixing segments of the first vertex v1 and the second vertex v2; and updating the vertices V to be vertices that are non-interior vertices, an interior vertex being a vertex for which all the lineages being transmitted therethrough have an ancestor.

2. The method of claim 1, wherein the process further comprises increasing a height of the ancestral recombination graph by an increment of 1.

3. The method of claim 1, wherein the process further comprises determining a waiting time $H_2$ of the first vertex $v_1$ and the second vertex $v_2$ to have a common ancestor, where $$H_2 = \min_{t=1,\ldots,n_t} H_t, n_t = |T|,$$

$T=\{1 \leq t \leq M | L_t > 1\}$, $t=1, 2, \ldots, M$, and for each t, $L_t$ is initialized to K, wherein $H_t$ is a value of a random variable, and wherein $L_t$ is a number of lineages for a tree t at a given iteration.

4. The method of claim 3, wherein the common ancestor is the single vertex into which the two adjoining segments in the M non-mixing segments of the first vertex $v_1$ and the second vertex $v_2$ have been combined, and the single vertex is placed in the ancestral recombinations graph at a depth corresponding to the waiting time.

5. The method of claim 3, wherein a probability that the first vertex $v_1$ and the second vertex $v_2$ have a common ancestor is $$P(H_t \leq x) = 1 - e^{-\binom{L_r}{2}x},$$

wherein $L_r$ is a number of lineages of a randomly selected tree r.

6. The method of claim 3, wherein the waiting time $H_2$ is measured in generations.

7. The method of claim 1, further comprising:

after the process ends, determining a root node of the ancestral recombination graph based on a probability $$P(H_{n_v} \leq t) = \sum_{k=1}^{n_v} (-1)^{k-1}(2k-1)e^{-k(k-1)t/2}\frac{(n_v-1)\ldots(n_v-(k-1))}{(n_v+1)\ldots(n_v+(k-1))}$$

wherein $H_{n_v}$ is a waiting time of $n_v$ vertices to have a common ancestor, where $n_v$ is assigned K, and $t=1, 2, \ldots, M$.

8. The method of claim 1, further comprising annotating edges of the ancestral recombination graph with genetic events.

9. An information processing system for constructing an ancestral recombination graph, the information processing system comprising:

memory;

a processor communicatively coupled to the memory; and an ancestral recombination graph constructor communicatively coupled to the memory and the processor, the ancestral recombination graph constructor being configured to:

receive a value K, where K is a positive integer number of extant units representing K individuals of a current generation being studied;

receive M non-mixing segments in the K extant units, where M is a positive integer number;

generate K vertices V, each of the K extant units being initially assigned to the K vertices V, and K lineages for each of M trees being associated with each of the K vertices; and construct an ancestral recombination graph based on at least the K extant units and the M non-mixing segments, wherein constructing the ancestral recombination graph comprises repeating, until only one lineage survives for each of the M trees, a process comprising:

randomly selecting one tree from the M trees;

randomly selecting a first vertex $v_1$ and a second vertex $v_2$ from the vertices V;

combining two adjoining segments in the M non-mixing segments of the first vertex $v_1$ and the second vertex $v_2$ together into a single vertex;

generating a separate vertex for at least one remaining segment in each of the M non-mixing segments of the first vertex $v_1$ and the second vertex $v_2$; and updating the vertices V to be vertices that are non-interior vertices, an interior vertex being a vertex for which all the lineages being transmitted therethrough have an ancestor.

10. The information processing system of claim 9, wherein the process further comprises determining a waiting time $H_2$ of the first vertex $v_1$ and the second vertex $v_2$ to have a common ancestor, where $$H_2 = \min_{t=1,\ldots,n_t} H_t, n_t = |T|,$$

$T=\{1 \leq t \leq M | L_t > 1\}$, $t=1, 2, \ldots, M$, and for each t, $L_t$ is initialized to K wherein $H_t$ is a value of a random variable, and wherein $L_t$ is a number of lineages for a tree t at a given iteration.

11. The information processing system of claim 10, wherein a probability that the first vertex $v_1$ and the second vertex $v_2$ have a common ancestor is $$P(H_t \leq x) = 1 - e^{-\binom{L_r}{2}x},$$

wherein $L_r$ is a number of lineages of a randomly selected tree r.

12. The information processing system of claim 9, wherein the method performed by the ancestral recombination graph constructor further comprises:

after the process ends, determining a root node of the ancestral recombination graph based on a probability $$P(H_{n_v} \le t) = \sum_{k=1}^{n_v} (-1)^{k-1}(2k-1)e^{-k(k-1)t/2} \frac{(n_v - 1) \ldots (n_v - (k-1))}{(n_v + 1) \ldots (n_v + (k-1))}$$

wherein $H_{n_v}$ is a waiting time of $n_v$ vertices to have a common ancestor, where $n_v$ is assigned K, and t=1, 2, ..., M.

13. A non-transitory computer-readable medium encoded with a program for constructing an ancestral recombination graph, the program comprising instructions for:

receiving a value K, where K is a positive integer number of extant units representing K individuals of a current generation being studied;

receiving M non-mixing segments in the K extant units, where M is a positive integer number;

generating K vertices V, each of the K extant units being initially assigned to the K vertices V, and K lineages for each of M trees being associated with each of the K vertices; and constructing an ancestral recombination graph based on at least the K extant units and the M non-mixing segments, wherein constructing the ancestral recombination graph comprises repeating, until only one lineage survives for each of the M trees, a process comprising:
  randomly selecting one tree from the M trees;
  randomly selecting a first vertex $v_1$ and a second vertex $v_2$ from the vertices V;
  combining two adjoining segments in the M non-mixing segments of the first vertex $v_1$ and the second vertex $v_2$ together into a single vertex;
  generating a separate vertex for at least one remaining segment in each of the M non-mixing segments of the first vertex $v_1$ and the second vertex $v_2$; and
  updating the vertices V to be vertices that are non-interior vertices, an interior vertex being a vertex for which all the lineages being transmitted therethrough have an ancestor.

14. The non-transitory computer-readable medium of claim 13, wherein the process further comprises increasing a height of the ancestral recombination graph by an increment of 1.

15. The non-transitory computer-readable medium of claim 13, wherein the process further comprises determining a waiting time $H_2$ of the first vertex $v_1$ and the second vertex $v_2$ to have a common ancestor, where $$H_2 = \min_{t=1,\ldots,n_t} H_t, \; n_t = |T|,$$

T={1≤t≤M|$L_t$>1}, t=1, 2, ..., M, and for each t, $L_t$ is initialized to K wherein $H_t$ is a value of a random variable, and wherein $L_t$ is a number of lineages for a tree t at a given iteration.

16. The non-transitory computer-readable medium of claim 15,
  wherein the common ancestor is the single vertex into which the two adjoining segments in the M non-mixing segments of the first vertex $v_1$ and the second vertex $v_2$ have been combined, and
  the single vertex is placed in the ancestral recombinations graph at a depth corresponding to the waiting time.

17. The non-transitory computer-readable medium of claim 15, wherein a probability that the first vertex $v_1$ and the second vertex $v_2$ have a common ancestor is $$P(H_t \le x) = 1 - e^{-\binom{L_r}{2}x},$$

wherein $L_r$ is a number of lineages of a randomly selected tree r.

18. The non-transitory computer-readable medium of claim 15, wherein the waiting time $H_2$ is measured in generations.

19. The non-transitory computer-readable medium of claim 13, further comprising:
  after the process ends, determining a root node of the ancestral recombination graph based on a probability $$P(H_{n_v} \le t) = \sum_{k=1}^{n_v} (-1)^{k-1}(2k-1)e^{-k(k-1)t/2} \frac{(n_v - 1) \ldots (n_v - (k-1))}{(n_v + 1) \ldots (n_v + (k-1))}$$

wherein $H_{n_v}$ is a waiting time of $n_v$ vertices to have a common ancestor, where $n_v$ is assigned K, and t=1, 2, ..., M.

20. The non-transitory computer-readable medium of claim 13, further comprising annotating edges of the ancestral recombination graph with genetic events.

* * * * *